(12) United States Patent
Yudanov

(10) Patent No.: US 9,541,045 B2
(45) Date of Patent: Jan. 10, 2017

(54) FUEL INJECTION SYSTEM WITH PRESSURE-CONTROLLED BLEED FUNCTION

(75) Inventor: Sergi Yudanov, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 614 days.

(21) Appl. No.: 13/809,895

(22) PCT Filed: Jun. 15, 2011

(86) PCT No.: PCT/SE2011/000113
§ 371 (c)(1),
(2), (4) Date: Feb. 6, 2013

(87) PCT Pub. No.: WO2012/008892
PCT Pub. Date: Jan. 19, 2012

(65) Prior Publication Data
US 2013/0213357 A1    Aug. 22, 2013

(30) Foreign Application Priority Data
Jul. 14, 2010   (SE) ...................................... 1000767

(51) Int. Cl.
*F02M 57/02*   (2006.01)
*F02M 47/00*   (2006.01)
(Continued)

(52) U.S. Cl.
CPC ......... *F02M 47/00* (2013.01); *F02M 21/0245* (2013.01); *F02M 37/0029* (2013.01);
(Continued)

(58) Field of Classification Search
CPC ............ F02M 37/0023; F02M 37/0029; F02M 37/0052; F02M 2200/04; F02M 55/001; F02M 55/007; F02M 63/0215; F02M 63/024; F02M 63/02; F02M 47/00; F02M 21/0245; F02M 63/0052; F02M 59/34; Y02T 10/32
(Continued)

(56) References Cited

U.S. PATENT DOCUMENTS 2,580,696 A * 1/1952 Novak .................. F02N 19/001
                                                      210/167.31
3,789,819 A * 2/1974 Moulds .............. F02M 51/0675
                                                      123/455
(Continued)

FOREIGN PATENT DOCUMENTS

DE        4320620        1/1995
EP        0995897 A2     4/2000
(Continued)

OTHER PUBLICATIONS

Russian Official Action (Jul. 4, 2014) for corresponding Russian Application 2013 106 153.
(Continued)

*Primary Examiner* — Stephen K Cronin
*Assistant Examiner* — Brian Kirby
(74) *Attorney, Agent, or Firm* — WRB-IP LLP

(57) ABSTRACT

A fuel injection system with a high-pressure fuel injection pump is provided for pressurizing fuel and delivering it for injection into an internal combustion engine. The system and the high-pressure fuel injection pump have an inlet, a return port, at least one plunger, a suction, channel positioned between the inlet and plunger, and a bleed valve connectively arranged at the suction channel of the high-pressure fuel injection pump, A selector valve is provided between the inlet, and return port.

15 Claims, 1 Drawing Sheet

(51) Int. Cl.
*F02M 63/02* (2006.01)
*F02M 37/00* (2006.01)
*F02M 59/34* (2006.01)
*F02M 63/00* (2006.01)
*F02M 21/02* (2006.01)

(52) U.S. Cl.
CPC ........ *F02M 37/0052* (2013.01); *F02M 59/34* (2013.01); *F02M 63/0052* (2013.01); *F02M 63/02* (2013.01); *Y02T 10/32* (2013.01)

(58) Field of Classification Search
USPC ............... 123/514, 447, 455, 458, 459, 461, 123/516, 123/446; 701/102
See application file for complete search history.

(56) References Cited

U.S. PATENT DOCUMENTS

| | | | | |
|---|---|---|---|---|
| 4,269,572 A * | 5/1981 | Nozawa | ............... | F04B 17/042 137/110 |
| 4,553,697 A * | 11/1985 | Nothen | ................. | F02D 33/006 123/142.5 E |
| 4,557,237 A * | 12/1985 | Bally | ..................... | F02M 41/06 123/450 |
| 4,878,474 A * | 11/1989 | Hack, Jr. | .............. | F02M 55/007 123/456 |
| 5,076,227 A * | 12/1991 | Krieger | .............. | F02M 63/0215 123/198 DB |
| 5,426,971 A * | 6/1995 | Glidewell | .............. | G01N 9/002 123/516 |
| 5,598,817 A * | 2/1997 | Igarashi | ................ | F02D 41/062 123/179.17 |
| 5,701,873 A * | 12/1997 | Schneider | ............. | F02M 59/34 123/462 |
| 5,718,208 A * | 2/1998 | Brautigan | ............. | F02M 37/20 123/509 |
| 5,878,718 A * | 3/1999 | Rembold | ............. | F02D 33/006 123/198 D |
| 5,911,208 A * | 6/1999 | Furusawa | .......... | F02M 63/0245 123/456 |
| 5,996,556 A * | 12/1999 | Klinger | .................. | F02M 59/34 123/446 |
| 6,065,436 A * | 5/2000 | Koga | ..................... | F02D 41/062 123/179.17 |
| 6,065,453 A * | 5/2000 | Zych | .................... | F02M 55/001 123/506 |
| 6,142,120 A * | 11/2000 | Biester | ............... | F02D 41/3082 123/446 |
| 6,293,253 B1 * | 9/2001 | Arnold | ..................... | F02D 41/38 123/446 |
| 6,325,051 B1 | 12/2001 | Oomori et al. | | |
| 6,386,186 B1 * | 5/2002 | Coplin | .................. | F02B 61/045 123/521 |
| 6,564,776 B1 * | 5/2003 | Haeberer | ........... | F02M 63/0225 123/456 |
| 6,647,965 B1 * | 11/2003 | Breeden | ..................... | F01L 9/02 123/446 |
| 6,663,349 B1 * | 12/2003 | Discenzo | ............... | F04D 29/669 417/300 |
| 6,748,923 B2 * | 6/2004 | Zander | ............... | F02M 37/0029 123/446 |
| 6,755,625 B2 * | 6/2004 | Breeden | ................ | F04B 49/225 123/179.17 |
| 6,769,414 B2 * | 8/2004 | Rembold | .............. | F02D 33/006 123/179.17 |
| 6,772,734 B2 * | 8/2004 | Schueler | ................ | F02M 59/34 123/446 |
| 6,805,105 B2 | 10/2004 | Kato et al. | | |
| 7,343,901 B2 * | 3/2008 | Mori | ...................... | F02M 37/22 123/446 |
| 7,527,035 B2 * | 5/2009 | Schroeder | .............. | F02M 55/00 123/446 |
| 7,594,499 B2 * | 9/2009 | Suzuki | ............... | F02M 37/0041 123/446 |
| 8,424,508 B2 * | 4/2013 | Adler | ................... | F02D 41/1401 123/458 |
| 2002/0092505 A1 * | 7/2002 | Rembold | .......... | F02M 37/0052 123/464 |
| 2002/0170508 A1 * | 11/2002 | Joos | ........................ | F01P 1/06 123/41.31 |
| 2002/0189589 A1 * | 12/2002 | Kato | ...................... | F02M 21/08 123/458 |
| 2008/0184969 A1 | 8/2008 | Chroeder | | |
| 2009/0007892 A1 | 1/2009 | Burkitt | | |
| 2011/0106393 A1 * | 5/2011 | Pursifull | ............. | F02D 33/003 701/101 |

FOREIGN PATENT DOCUMENTS

| | | | |
|---|---|---|---|
| JP | 10331738 A | | 12/1998 |
| JP | 2003113741 A | * | 4/2003 |
| JP | 2003515033 A | | 4/2003 |
| WO | 0136809 A1 | | 5/2001 |
| WO | 2008085098 A1 | | 7/2008 |

OTHER PUBLICATIONS

Official Communication (Jan. 8, 2014) for corresponding European App. 11807136.4.
International Search Report (Oct. 27, 2011) for corresponding International application No. PCT/SE2011/000113.
Japanese Official Action (May 28, 2015) for corresponding Japanese App. 2013-519624 (Note—JP2003515033 corresponds to U.S. Pat. No. 6,564,776).

* cited by examiner

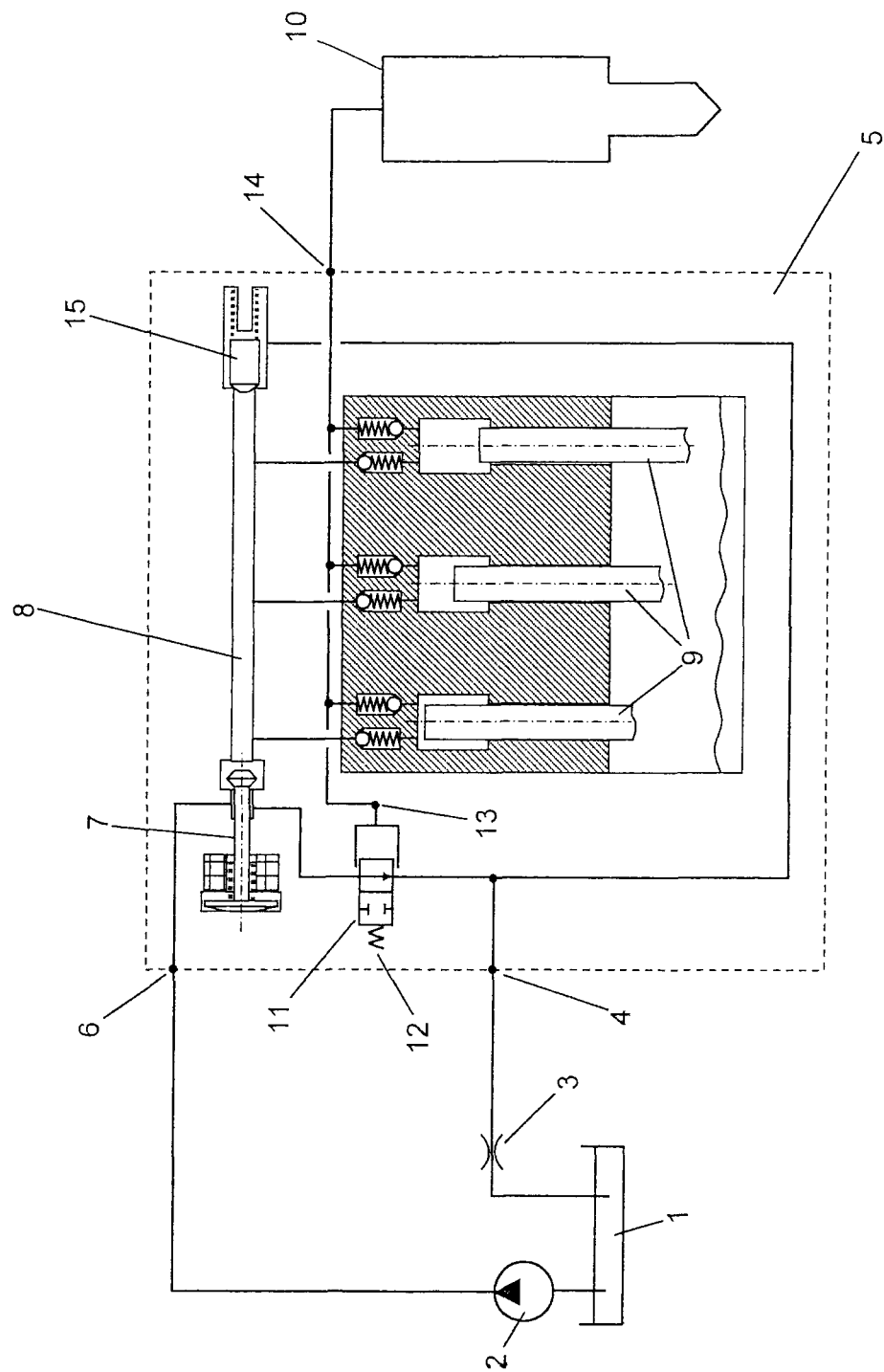

FUEL INJECTION SYSTEM WITH PRESSURE-CONTROLLED BLEED FUNCTION

BACKGROUND AND SUMMARY

The invention relates to a high-pressure fuel infection pump and to a. fuel Injection system comprising a high-pressure fuel injection pump.

Such high-pressure fuel injection pumps and fuel injection systems comprising such pumps are normally used for pressurizing fuel and for delivering it for injection into an internal combustion engine.

Rising prices of crude oil-derived fuels and fears of its Imminent shortages have in recent years led to further developments in production processes of alternative fuels and internal combustion engines for their use. One of the potentially important alternative fuels that can be effectively produced from a variety of stocks including biomass is dimethyl ether (DME). DME, with its soot-free combustion and high cetane number, is very well suited for diesel-type internal combustion processes. However, DME has a relatively high volatility (compared with normal diesel fuel) and, therefore, has to be pressurized, to approximately 5 bar in order to be liquid at room temperature. There are a number of advantages of having fuel supplied in liquid form for injection Into a diesel-type internal combustion engine, and thus fuel injection equipment (FIE) suited for DME or other similarly volatile fuel should be specially designed to prevent unwanted vaporization of the fuel or to effectively remove vapour cavities from such parts of the injection system where vapour can disrupt normal operation.

High-volatility fuels can be prevented from boiling by selecting a higher pressure and/or lower operating temperature. hi a particular engine application, fuel must be supplied to the injection pressure-generating part of the FIE at an optimum combination of fuel feed pressure and temperature. In selecting that optimum combination, the cost and complexity of the fuel feed system are significant controlling factors. Imbalance towards an higher feed pressure would, whilst allowing operation, at elevated temperatures, increase system cost, complexity, weight and energy consumption, at the same time itself causing extra fuel heat-up. On the other side, lowering fuel feed temperature beyond a certain limit would not be feasible, for obvious reasons.

In order to shift the combination between the fuel feed pressure and temperature towards more energy-efficient and less expensive balance, a number of design solutions are used in prior art systems. One such solution is recirculation of fuel feed flow throughout the system at a rate exceeding the rate of fuel consumption by the engine. By this means, equalization of temperatures between the coldest (such as fuel tank) and the hottest parts of the system is achieved and therefore the risk of local vaporization is reduced. Another approach is thermal insulation of parts of the system that are most exposed to heat sources.

For a number of reasons, the most suitable type of FIE for high-volatility fuels such as DME, is a common rail system well-known in the art. Such a system usually incorporates a multi-plunger high-pressure pump that supplies fuel under high pressure to injectors via a common rail. Over many years of development and use in the diesel engine industry, the typical high-pressure pump of a common rail system has evolved to incorporate the output control concept based on the inlet metering principle and fixed plunger displacement. This makes use of a single electronically controlled inlet metering valve (IMV) to define the amount, of fuel reaching the plungers during their respective inlet strokes. At a given feed pressure, varying the valve's restriction varies the output of the plungers which, in. turn, at a given engine consumption, varies the common rail pressure.

The single IMV, fixed, displacement route-plunger type of pump is widely accepted in common rail FIE on the grounds of its relative simplicity as compared to variable-displacement pumps. However, when high-volatility fuels are used, improvements to such a pump are necessary to ensure reliable performance across the full operating range of an engine. This is because in this type of pump there is a significantly large volume of fuel, situated in the suction channel leading fuel from the IMV up to the plungers, the pressure in which most, of the lime needs to be controlled to a lower level than the available feed pressure for the purpose of pump output control. By definition, this volume of the suction channel is then separate from the recirculated fuel feed circuit, and thus vulnerable to overheating and fuel vaporization. One way of alleviating this problem is to thermally insulate the suction channel from the surrounding parts. This works well down to a certain minimum fuel flow in the suction channel, but still the vaporization can take place when the flow is under that minimum, or when there isn't flow at all, for a relatively long period of time. The operating conditions requiring extremely low or no output from the high-pressure pump and correspondingly low through-flow in the suction channel, can occur frequently and it can be necessary for the pump to change from that to full output almost immediately, such as when a hot engine needs to start or when high torque is demanded after a period of engine braking. Once fuel is allowed to vaporize in the suction channel, the hydraulic efficiency of the pump is dramatically reduced and it can then take a long time before the pump can provide full output, unless special, action, is taken.

It is known in the art to provide a separate bleed function for the suction channel in order to be able to remove vapour from that channel instead of trying to liquefy it. The latter is usually a much longer process than vaporization, and to provide for liquefaction in a relatively hot pump, the feed pressure system would need to be capable of relatively high pressure and would therefore be unnecessarily complex, heavy and expensive. Bleeding the suction channel which is thermally insulated from the hot pump body, with a relatively cold and low-pressure fuel from the feed recirculation line, can simultaneously and effectively cool that channel and restore normal operation of the pump much easier. In that and other prior art systems, the bleed valve for the suction channel is electronically controlled, either by a separate electrical actuator or by means of an extended range actuator that simultaneously controls the bleed valve and the IMV. This adds cost because of the actuator(s) and. the need of a more sophisticated control algorithms for the engine management system (EMS).

In prior art systems, for the bleeding of the suction channel to be effective, a separate return line is provided between the bleed valve and the downstream of the feed pressure-setting restriction in the re-circulation circuit. This is necessary because otherwise the bleed path becomes parallel to the main re-circulation path that is designed to have as low restriction as possible up to the teed pressure-setting restriction, and in that case the pressure head across the suction channel and the bleed valve would be too small to drive the vapour out of the pump. In systems where the pressure-setting restriction has to be positioned relatively far away from the pump, the extra cost and complexity caused by the need for such separate return line, can be significant.

It is desirable to provide a fuel injection system comprising a high-pressure fuel injection pump that is less vulnerable to vapour formation in the fuel.

It is also desirable to provide a system for injection of high-volatility fuels, as for instance DME, for internal combustion engines.

It is also desirable to provide a system of injection of high-volatility fuels, such as DME, that has an improved performance and a lower cost, compared to prior art systems.

A general advantage of an aspect of the present invention is that it ensures automatic and effective removal of vapour that may form in the fuel and disrupt normal operation of the fuel injection pump, thereby enhancing the reliability and robustness of the control of delivery of pressurized fuel for injection into the internal combustion engine.

According to an aspect of the invention, a fuel injection system for pressurizing fuel and delivering it for injection into an internal combustion engine is proposed, wherein said system comprises a high-pressure fuel injection pump with an inlet (for receiving fuel from e.g. a fuel tank), at least one plunger (that pressurizes the received fuel and delivers it to injectors for injection into the internal combustion engine), a suction channel positioned between the inlet and the at least one plunger (thereby connecting the inlet of the high-pressure fuel injection pump with the inlet port of the at least one plunger), and a bleed valve connected to the suction channel for removal of vapour that may in certain circumstances form in the suction channel, and for cooling down the suction channel in order to prevent conditions causing further vaporization of the fuel in the suction channel. The fuel injection, system further comprises a return port (for leading any leakage and recirculated fuel back to a fuel tank). To ensure effective removal of vapour by the bleed valve, a selector valve is installed between the inlet and the return port.

In a preferred embodiment of an aspect of the invention, the selector valve is able to open or close the hydraulic connection between the inlet and the return port. An inlet-metering valve (IMV) is installed between the inlet and the suction channel for fine control of output of the high-pressure pump. For conditioning of incoming fuel that the IMV receives, a re-circulation of pressurized fuel is provided by means of a feed pump supplying fuel to the inlet, and an hydraulic flow restriction downstream of the return port. Advantageously, a non-return valve is employed to function as the bleed valve, having its inlet connected to the suction channel. The selector valve is actuated by a return spring and the pressure developed by the plunger, such that when the plunger pressure is below a p redetermined level, the spring closes the selector valve, and when the plunger pressure is above said level, the spring is compressed and the selector valve is open. The selector valve ensures the effective removal of vapour and cooling of the suction channel by selecting the series connection of the inlet, the suction channel and the return port, such that full re-circulation flow is established via the suction channel. Preferably, the said predetermined level of plunger pressure is chosen to be somewhat below the minimum setpoint pressure at which the engine is designed to operate, but at the same time above the pressure that the high-pressure pump is able to maintain when the fuel in the suction channel is vaporized. Then, in the event of uncontrolled vaporization in the suction channel leading to uncontrolled plunger pressure drop, the selector valve will close the connection of the inlet to the return port and establish full re-circulation flow through the IMV, the suction channel and the bleed non-return valve, thereby quickly removing the. vapour already formed and cooling the suction channel to prevent further vaporization. By this means, the pump will regain full output and quickly restore its outlet pressure to a given setpoint, at which instant further rise of output pressure would be cheeked by the IMV controlled by the EMS, Simultaneously, the increased plunger pressure will compress the spring to re-open the selector valve, such that the re-circulation flow will be resumed around the inlet of the IMV to ensure absence of hot spots and reliable delivery of liquid fuel to the inlet.

The invention, according to an aspect thereof advantageously allows a common teed pressure-setting restriction to be positioned downstream of the return port, because the selector valve allows establishing a series connection of the inlet and the suction channel to the return port, such that the bleed function is not reteriorated by by-pass recirculation flow from the inlet to the return port.

In another embodiment of an aspect of the invention, any or both of the bleed and selector valves are made electronically controlled, such that it is possible to control the bleed function with the EMS.

BRIEF DESCRIPTION OF THE DRAWINGS

The present invention together with the above-mentioned and other objects and advantages may be best understood from the following detailed description of preferred embodiments of the invention, but is not restricted to these embodiments, wherein it is shown schematically:

FIG. 1 a preferred embodiment of the fuel injection system according to the present invention, with a high-pressure fuel injection pump being equipped with an advantageous pressure-controlled selector valve and the bleed valve in the form of the non-return valve.

DETAILED DESCRIPTION

The Figure is merely a schematic representation, not intended to portray specific parameters of the invention. Moreover, the Figure is intended to depict only typical embodiment of the invention and therefore should not be considered as limiting the scope of the invention.

In FIG. 1, a preferred embodiment of the fuel injection system according to the present invention is shown. The system comprises a fuel tank I, a low-pressure fuel feed subsystem consisting of or comprising a feed pump 2, a flow restrictor 3 and a fuel return port 4. Further, the system comprises a high-pressure fuel injection pump 5 with an inlet 6, an inlet metering valve (IMV) 7, a suction channel 8 and exemplary three plungers 9, and a fuel injector 1.0 injecting the pressurized fuel into the internal combustion engine (not shown). The IMV 7, the injector 10 and the feed pump 2 and/or the restrictor valve 3 are controlled by an engine management, system (EMS) (not shown). In the Figure, a high-pressure fuel injection pump with three plungers 9 is shown which plungers 9 are phase-shifted in their pumping operation cycles. However, it is understood that the selection of just three plungers 9 is only an example. In actual fact the number of plungers in such a pump may vary depending on the application and the special conditions. Pumps with one, two, three, four, five, six or even more than six plungers can be used in connection with the invention. The system further comprises a selector valve 11 with a return spring 12, said valve being connected by its control port 13 to an outlet pressure port 14 of the high-pressure pump 5, and a bleed valve 5 in the form of a nonreturn valve connected by its inlet to the suction channel 8.

The fuel injection system in FIG. 1 works in the following way: the feed pump 2 draws fuel from the fuel tank 1 and pressurizes it to a certain feed pressure, pushing the fuel through the restrictor 3. This feed pressure is supplied to the inlet 6 of the high-pressure pump 5, said inlet being connected to the return port 4 via the selector valve 11.

Preferably, the EMS controls, the feed pump 2 and/or the restrictor 3 to achieve the required fuel feed pressure and at the same time establish fuel flow in excess of the amount required for power generation by the internal combustion engine. That excess amount of fuel flow constitutes a recirculation fuel flow, which helps keeping the fuel temperature relatively uniform throughout the feed pressure circuit so that local hot spots and vaporisation of fuel are with a high probability avoided, ensuring stable fuel properties at the inlet of the IMV 7.

The fuel at feed pressure is then admitted through the IMV 7 to the suction channel 8 and further to the inlet ports of the three pumping plungers 9 that are phase-shifted in their pumping operation cycles, as shown in the Figure. On the downward stroke, the plungers 9 fill in the mass of fuel that depends on the EMS-controlled restriction of the IMV 7, and then pump it out of the high-pressure fuel injection pump 5 through the outlet pressure port 14 and into the injector 10 for injecting it into the internal combustion engine. The excess flow of fuel from the feed pump 2 is directed through the selector valve 11, which is open by the pressure at its control port 13, to the return port 4 and into the restrictor 3. The check valve 15 is closed by the pressure at the return port 4 applied to its outlet.

In the event of overheating of fuel in the suction channel 8, which for instance can take place when the hot engine is stopped or during engine braking due to relatively low through-flow of fuel in the suction channel and the correspondingly poor cooling of that channel, the fuel in the suction channel 8 will begin to uncontrollably evaporate. The evaporation can occur quickly and, even when the engine and the pump are running, the relatively high vapour pressure would prevent, fresh liquid fuel from entering the suction channel through open IMV, whilst on the other hand the high compressibility of vapour will drastically reduce the hydraulic efficiency of the pumping action of the plungers. Due to these phenomena, the pressure at the outlet of the pump will begin to go down. Upon reaching a pre-determined, relatively low level, the force of that pressure applied to the selector valve 11 will be overcome by the force of the spring 12, such that the selector valve will close the connection between the inlet 6 and the return, port 4. Following this, the pressure at the outlet of the check valve 15 will be reduced, such that the check valve will be open by the upstream pressure coming from the feed pump 2 via the open IMV 7 and the suction channel 8. Thus, the open check, valve 15 and the suction channel 8 will become connected in series with the full recirculation path of the feed pump 2, allowing quick removal of the vapour out to the fuel tank 1 and also the cooling of the suction channel 8 by fresh liquid fuel incoming through the IMV. This will restore hydraulic efficiency of the plungers such that the pressure at the outlet 14 of the high-pressure pump and, consequently, at the control port 13 of the selector valve 11, will raise and eventually re-open, the selector valve, thereby raising the pressure at the outlet of the check valve 15 to close that valve and to prevent uncontrolled full output from the plungers. By this means, normal operation of the high-pressure pump 5 is restored.

In another embodiment of the present invention, the selector valve I land/or the bleed valve 15 can be made electronically controlled, such that the effective bleed function of the suction channel is then fully or partially controllable by the EMS.

The above description is provided for reference, and the present, invention can be constructed in many different versions and variants within the scope of the claims.

The invention claimed is:

1. A high-pressure fuel injection system for pressurizing fuel and delivering it fur injection into an internal combustion engine, the system comprising a high-pressure fuel injection pump with an inlet, at least one plunger, a suction channel positioned between the inlet and plunger, the system further comprising a return port, and a bleed valve connectively arranged at the suction channel of the high-pressure fuel injection pump, wherein a selector valve is provided between the inlet and return port, and an inlet metering valve is connectively arranged between the inlet and the suction channel, the bleed valve being connectively arranged between the inlet metering valve and the plunger, an outlet of the selector valve being in fluid communication with an outlet of the bleed valve.

2. A fuel injection system according to claim 1, wherein the bleed valve is connectively arranged between the suction channel and the return port.

3. A fuel injection system according to claim 1. wherein the selector valve is able to control hydraulic flow restriction between the inlet and return port.

4. A fuel injection system according to claim 1, wherein the selector valve is able to open or close the hydraulic connection between the inlet and return port.

5. A fuel injection system according to claim 1, wherein the selector valve is controlled by pressure developed by the plunger.

6. A fuel injection system according to claim 5, wherein the selector valve is fully closed when the pressure developed by the plunger is below a predetermined level, and is partially or fully open when the pressure is at or above the predetermined level.

7. A fuel injection system according to claim 1, wherein the selector valve is electronically controlled.

8. A fuel injection system according to claim 1, wherein the bleed valve is controlled by pressure developed by the plunger.

9. A fuel injection system according to claim 1, wherein the bleed valve is fully open when the pressure developed by the plunger is below a predetermined level, and is partially or fully closed when the pressure is at or above the predetermined level.

10. A fuel injection system according to claim 1, wherein the bleed valve is electronically controlled.

11. A fuel injection system according to claim 1, wherein the bleed valve is a non-re urn valve connected by its inlet to the suction channel.

12. A fuel injection system according to claim 1, wherein an hydraulic flow restrictor is installed between the inlet and return port.

13. A fuel injection system according to claim 1, wherein an hydraulic flow restrictor is installed downstream of the return port.

14. A fuel injection system according to claim 1, wherein the bleed valve is in constant fluid communication with the suction channel.

15. A fuel injection system according to claim 1, wherein the bleed valve is directly connected to the suction channel.

* * * * *